(12) United States Patent
Stevens

(10) Patent No.: US 7,696,874 B2
(45) Date of Patent: Apr. 13, 2010

(54) METHODS AND SYSTEMS FOR MONITORING GROUPS OF ITEMS, ELEMENTS, AND/OR PRODUCTS USING RADIO FREQUENCY IDENTIFICATION

(75) Inventor: S. Graham Stevens, Charlotte, NC (US)

(73) Assignee: Casella Waste Systems, Inc., Rutland, VT (US)

( * ) Notice: Subject to any disclaimer, the term of this patent is extended or adjusted under 35 U.S.C. 154(b) by 1155 days.

(21) Appl. No.: 11/269,221

(22) Filed: Nov. 8, 2005

(65) Prior Publication Data
US 2007/0102506 A1    May 10, 2007

(51) Int. Cl.
*G08B 13/14* (2006.01)
(52) U.S. Cl. ............ 340/572.1; 340/539.1; 340/539.11; 340/825.36; 340/825.49
(58) Field of Classification Search .................. 340/506, 340/539.1, 539.11, 572.1, 825.36, 825.49
See application file for complete search history.

(56) References Cited

U.S. PATENT DOCUMENTS

| | | | |
|---|---|---|---|
| 6,211,781 B1 | 4/2001 | McDonald | |
| 6,600,418 B2 * | 7/2003 | Francis et al. | 340/572.1 |
| 2003/0112155 A1 * | 6/2003 | Landre et al. | 340/988 |
| 2005/0004702 A1 | 1/2005 | McDonald | |

* cited by examiner

*Primary Examiner*—Daryl Pope
(74) *Attorney, Agent, or Firm*—Wilmer Cutler Pickering Hale and Dorr LLP

(57) ABSTRACT

Methods and systems for monitoring one or more products by grouping the products into lots are described. Methods and systems of the present invention provide significant benefits over adding an RFID tag to represent and monitor a group of products. For example, the present invention simplifies data management by monitoring information associated with lots, rather than each individual product. In addition, information pertaining to all products included in a lot may be obtained by although only a small portion of products in the lot can be identified.

19 Claims, 15 Drawing Sheets

Lot #A1

302 ↓   Historical information (may be redundant)

| Product ID | Sender | Recipient | Weather | Operator |
|---|---|---|---|---|
| A1 (200) | John | Kelly | Sunny | 241 |
| B1 (202) | Kim | Jim | Sunny | 241 |
| N1 (204) | Sam | Greg | Sunny | 241 |

*FIG. 3A*

Sub-Lot #N1'  310 ↓   Historical information (redundant)

| Product ID | Sender | Recipient | Weather | Operator |
|---|---|---|---|---|
| A1 | John | Kelly | Overcast | 336 |
| B1 | Kim | Jim | Overcast | 336 |
| A2 | Mitch | David | Overcast | 336 |

*FIG. 3E*

Sub-Lot #N2'  312 ↓   Historical information (redundant)

| Product ID | Sender | Recipient | Weather | Operator |
|---|---|---|---|---|
| N1 | Sam | Greg | Overcast | 336 |
| B2 | Kirsti | Rachel | Overcast | 336 |
| N2 | Isabel | Alex | Overcast | 336 |

*FIG. 3F*

Sub-Lot #N1"    314 ↓    Historical information (redundant)

| Product ID | Sender | Recipient | Weather | Operator |
|---|---|---|---|---|
| A1 (200) | John | Kelly | Sunny | 887 |
| B1 (202) | Kim | Jim | Sunny | 887 |
| N1 (204) | Sam | Greg | Sunny | 887 |
| A2 (212) | Ed | Kramer | Sunny | 887 |
| B2 (214) | Jack | Maria | Sunny | 887 |
| N2 (216) | Monica | Joe | Sunny | 887 |
| AN (226) | Jill | Smith | Sunny | 887 |
| BN (228) | Park | Kim | Sunny | 887 |
| NN (230) | Quentin | Sarge | Sunny | 887 |

*FIG. 3G*

Sub-Lot #N2"    316 ↓    Historical information (redundant)

| Product ID | Sender | Recipient | Weather | Operator |
|---|---|---|---|---|
| Lot #AN (210) | | | Sunny | 887 |
| Lot #(N-1)1 (222) | | | Sunny | 887 |
| Lot #(N-1)N (224) | | | Sunny | 887 |

*FIG. 3H*

LOT #495294

402

| RFID tag # | Operator | Drop-off time | Pick-up time | Pick-up location | Truck | Weather | Temp. | Arrival time | Arrival location |
|---|---|---|---|---|---|---|---|---|---|
| RF112 | 441 | 7/8/2005; 7:04 am | 7/8/2005; 3:02 pm | Drop-off #41 | 42 | Sunny, clear | 104° F | 7/8/2005; 3:43 pm | Ithaca airport |
| RF315 | 441 | 7/8/2005; 11:53 am | 7/8/2005; 3:02 pm | Drop-off #41 | 42 | Sunny, clear | 104° F | 7/8/2005; 3:43 pm | Ithaca airport |
|  |  |  |  |  |  |  |  |  |  |
| RF342 | 441 | 7/8/2005; 2:04 pm | 7/8/2005; 3:02 pm | Drop-off #41 | 42 | Sunny, clear | 104° F | 7/8/2005; 3:43 pm | Ithaca airport |

Master LOT #39434939-003

| Lot # | Operator | Pick-up time | Pick-up location | Truck | Weather | Temp. | Arrival time | Arrival location |
|---|---|---|---|---|---|---|---|---|
| 495294 | 622 | 7/8/2005; 4:12 pm | Ithaca airport | 20 | Sunny, clear | 74° F | 7/8/2005; 6:23 pm | LGA |
| 492042 | 622 | 7/8/2005; 4:12 pm | Ithaca airport | 20 | Sunny, clear | 74° F | 7/8/2005; 6:23 pm | LGA |
| 324059 | 622 | 7/8/2005; 4:12 pm | Ithaca airport | 20 | Sunny, clear | 74° F | 7/8/2005; 6:23 pm | LGA |
| 234927 | 622 | 7/8/2005; 4:12 pm | Ithaca airport | 20 | Sunny, clear | 74° F | 7/8/2005; 6:23 pm | LGA |
| 234982 | 622 | 7/8/2005; 4:12 pm | Ithaca airport | 20 | Sunny, clear | 74° F | 7/8/2005; 6:23 pm | LGA |
| 239487 | 622 | 7/8/2005; 4:12 pm | Ithaca airport | 20 | Sunny, clear | 74° F | 7/8/2005; 6:23 pm | LGA |

*FIG. 4B*

METHODS AND SYSTEMS FOR MONITORING GROUPS OF ITEMS, ELEMENTS, AND/OR PRODUCTS USING RADIO FREQUENCY IDENTIFICATION

TECHNICAL FIELD

Embodiments of the present invention relate to methods and systems for monitoring groups of items, elements, and/or products using radio frequency identification (RFID) technology.

BACKGROUND

Since the 1980s, radio frequency identification (RFID) technology has been available and utilized in various contexts. To operate, RFID systems do not require a direct line-of-sight between, for example, a product label (a RFID tag) and a product label reader (a RFID tag reader). Known RFID tags can be read in a relatively short amount of time (e.g., 2 milliseconds per tag), and can also receive and store information that is desired to be added to the RFID tag over time.

RFID technology has been utilized to track and monitor individual products. For example, U.S. Pat. No. 6,211,781 describes the use of RFID technology to track and locate a moveable article, such as a piece of mail.

However, to date, using a RFID tag to monitor a group of items, elements, and/or products has not been utilized in certain contexts. For example, adding a single RFID tag to monitor a group of items, elements, and/or products is generally ineffective since the RFID tag may become lost, separated, and/or damaged. Furthermore, the group of products may need to be sub-divided at a later time, and the sub-groups can no longer be tracked using the added single RFID tag. In addition, there may be circumstances where it is not possible to accurately determine which individual products are included in a group of products.

We have discovered that providing a system and a method that can be used to monitor groups of products having RFID tags is needed.

SUMMARY OF THE INVENTION

In accordance with an embodiment of the present invention, a method that can be used to facilitate, for example, monitoring groups of items, elements, and/or products includes reading, utilizing a radio frequency identifier (RFID) reader device, data stored on an RFID tag associated with one or more items, elements, and/or products. The data can be stored in a repository and at least a portion of the one or more items, elements, and/or products can be grouped into a lot. Then collective data associated with the lot can be generated from the data stored on an RFID tag associated with one or more items, elements, and/or products, and the lot can be monitored or referenced over time.

In accordance with another embodiment of the present invention, a system used to facilitate, for example, monitoring groups of items, elements, and/or products includes a computer program product residing on a computer readable medium. The system can include a computer program product having instructions for causing a computer to read, utilizing a radio frequency identifier (RFID) reader device, data stored on an RFID tag associated with one or more items, elements, and/or products. The computer program can also contain instructions to store the data in a repository and to group at least a portion of the one or more items, elements, and/or products into a lot. The computer program product can further contain instructions to generate collective data associated with the lot from the old data, and monitor the lot.

BRIEF DESCRIPTION OF THE DRAWINGS

The following Detailed Description of the invention will be best understood when read in reference to the accompanying figures wherein:

FIG. 3A shows an exemplary repository that may be used to monitor groups of products when individual products are grouped into a Lot in accordance with one or more embodiments of the present invention;

FIGS. 3E and 3F show exemplary repositories that may be used to monitor groups of products when a Lot is sub-divided into two or more Sub-Lots in accordance with one or more embodiments of the present invention;

FIGS. 3G and 3H show exemplary repositories that may be used to monitor groups of products when Lots and individual products are grouped and sub-divided into two or more Sub-Lots in accordance with one or more embodiments of the present invention;

FIGS. 4A to 4C show additional exemplary repositories that may be used to monitor groups of products in accordance with one or more embodiments of the present invention;

DETAILED DESCRIPTION OF THE INVENTION

Figure 1:
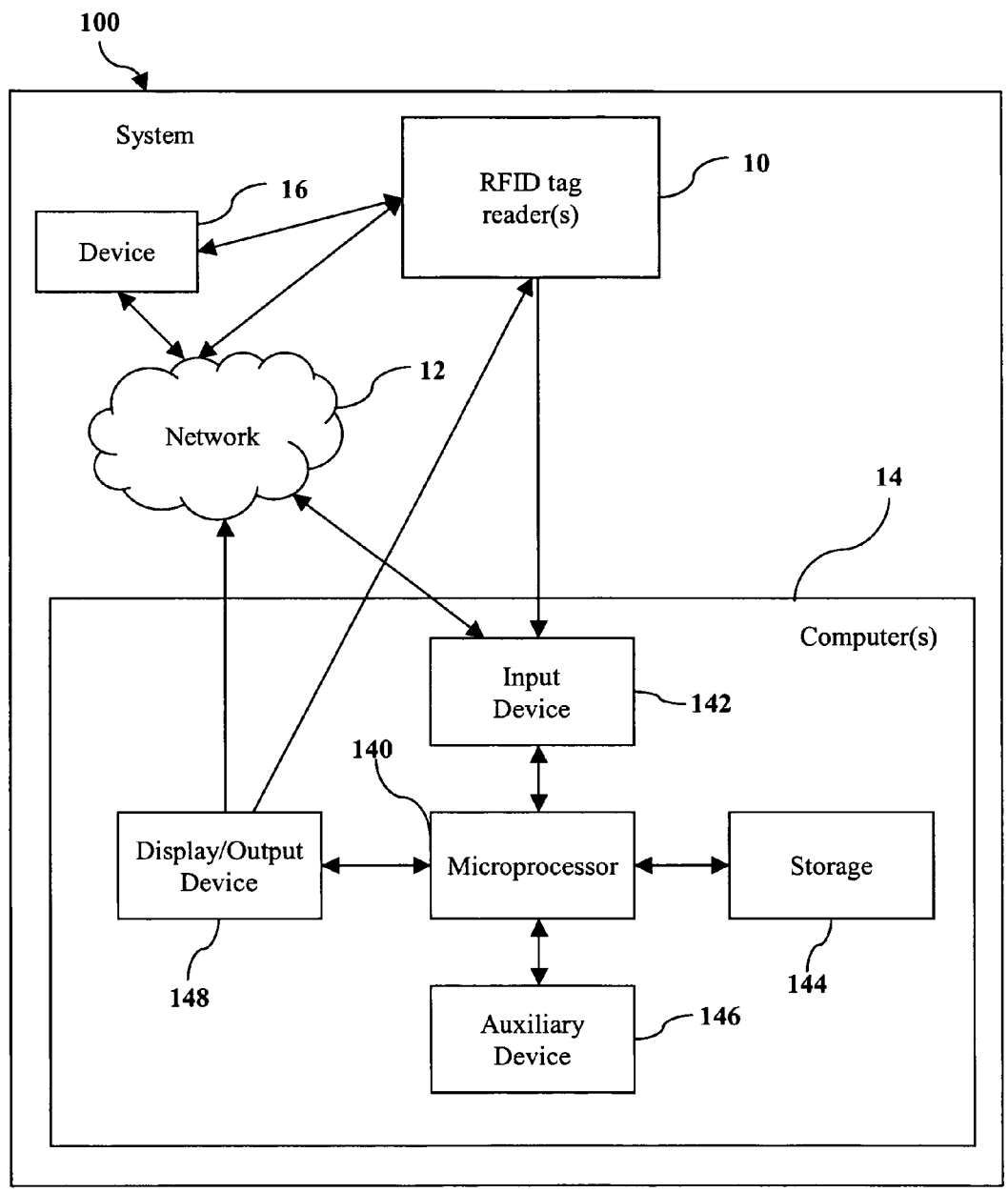
FIG. 1 is a system for monitoring groups of products using RFID technology in accordance with an embodiment of the present invention.

FIG. 1, generally at 100, shows a system for monitoring, for example, groups of products, items, elements, components, etc. (hereinafter "products"), in accordance with an embodiment of the present invention. Products, as utilized herein, may refer to any physical items. Products 200, 202, 204, 212, 214, 216, 226, 228, and 230 shown in FIGS. 2A-2C, for example, may be a mail package, a box, a recyclable, or a bale.

As illustrated, system 100 may include or utilize at least one RFID tag reader 10, at least one standard general-purpose computer 14, and at least one device 16.

Computer 14 may include or utilize a standard microprocessor 140, and at least one input device 142 such as a keyboard, a mouse, and/or a data capture device. Computer 14 may also include or utilize a storage device 144 such as a hard drive, an auxiliary device 146 such as a speaker, and an output device 148 such as a standard monitor and/or a printer. Input device 142 and output device 148 may be implemented as a single unit like a data capture/output device. Computer 14 may store any desired information pertaining to the individual products and/or groups of products in storage device 144.

Device 16 may be, for example, a customized handheld device or the like, and may communicate, either directly or via network 12, with computer 14 and RFID tag reader(s) 10 (direct connection to computer 14 not shown in FIG. 1). An operator may utilize device 16, having a suitable and/or a customizable software, to instruct RFID tag reader(s) 10 to begin and/or end reading RFID tags. In addition, an operator may, using device 16, having commercially available or custom software, instruct computer 14 to associate a group of products with a unique (sub-)lot number. For example, device 16 may be a Compaq iPAQ Pocket PC. Device 16 may further contain software customized for instructing computer 14 to associate a group of products with a unique (sub-)lot number. Device 16 may also be a custom-built handheld device capable of communicating with RFID tag reader(s) 10 and computer 14.

RFID tag reader(s) 10 may read information pertaining to individual products or groups of products from one or more RFID tags and transmit this information, either directly or through a network 12 to computer(s) 14 via input device(s) 142 and output device(s) 148. RFID tag reader 10 may be, for example, a Socket RFID Reader Card RF5400-542, a Visonic TIABKT2 Stand-Alone Proximity Reader, or an Isonas Wireless IP Proximity Reader. RFID tag reader 10 may also be capable of writing data to RFID tags. These exemplary devices may be modified as necessary to operate in accordance with at least some embodiments of the present invention.

Network 12 may be a wireless network, such as a wireless local area network or the Internet accessed through a wireless local area network, or a wired network, such as a local area network or the Internet accessed through a wired local area network.

Figure 2A:
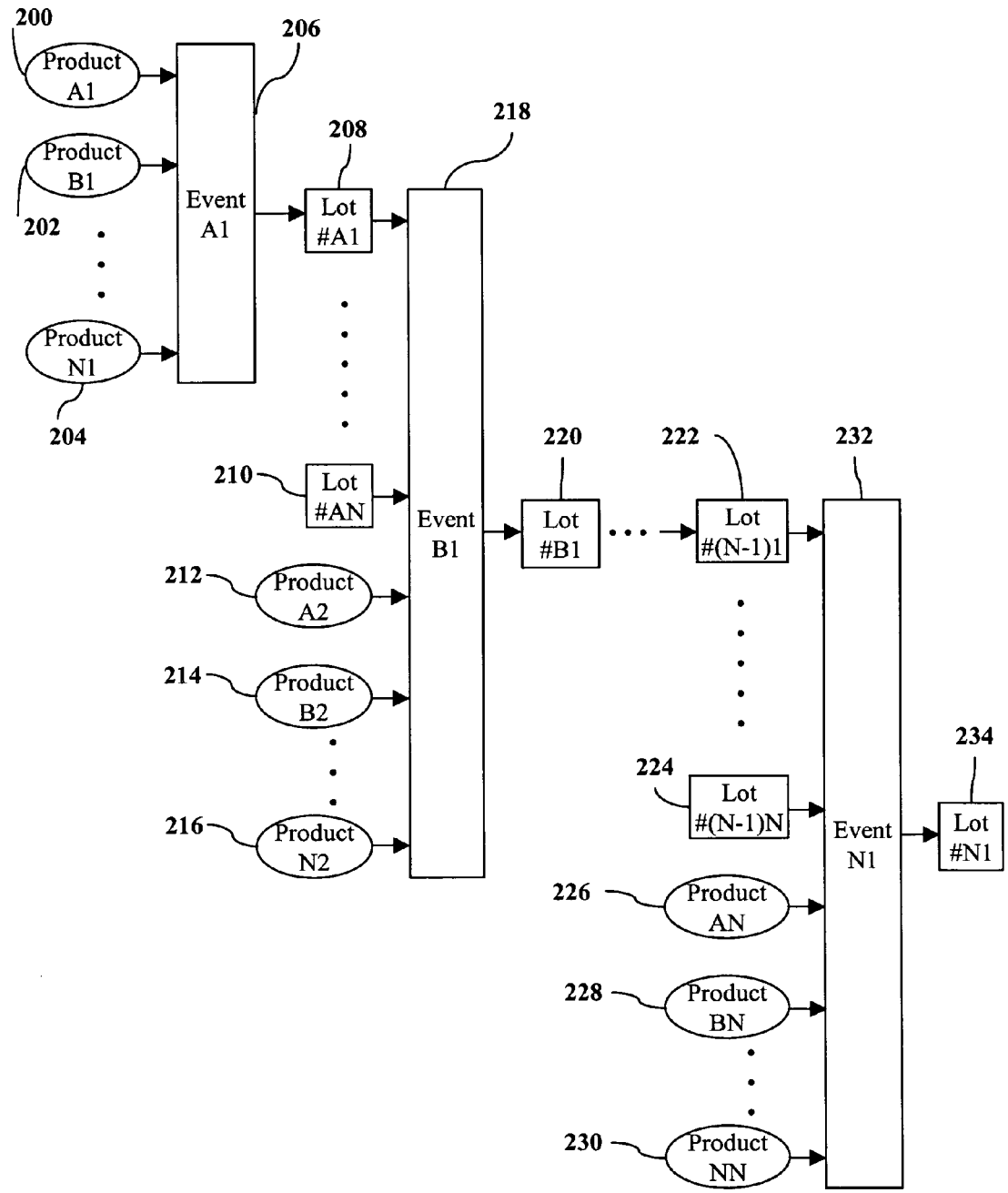
FIG. 2A is a method of grouping products and monitoring groups of products in accordance with an embodiment of the present invention.

FIG. 2A shows a method of grouping products into Lots and monitoring Lots in accordance with an embodiment of the present invention. Lots, in turn, can be further aggregated with other Lots and individual products to form new Lots having an increasingly larger number of individual products.

Initially, a plurality of individual products A1 200, B1 202, and N1 204 may be grouped together, at various times and/or time spans, through or by an Event A1 206, and denoted as, for example, Lot #A1 208. Events such as A1 206, B1 218, and N1 232 shown in FIG. 2A may be or represent, for example, gathering products together within a certain physical area, passing products through a certain area, placing products in a certain area for a certain range of time, products being in proximity to other products or groups of products having similar characteristics, and/or products going through a similar handling or manufacturing process.

For example, products A1 200, B1 202, and N1 204 may be dropped off at a drop-off center. An operator may collect products A1 200, B1 202, and N1 204 at the drop-off center. The operator may be utilizing device 16, which may be a Compaq iPAQ Pocket PC having a customized software and having a touch-sensitive display screen displaying the following menu buttons: "Begin grouping of products" and "End grouping of products". Device 16 may be in communication with computer 14 via a wireless network 12. RFID tag reader 10 may be Socket RFID Reader Card RF5400-542 inserted into the Compact Flash slot of the Compaq iPAQ Pocket PC.

To begin grouping of products, an operator may press the "Begin grouping of products" button. Upon pressing the "Begin grouping of products" button, device 16 may then indicate "Do you wish to scan items?" and display "Yes and "No" buttons. If the "Yes" button is selected, device 16 may then display "Are the products ready to be scanned?" and show "Yes" and "No" buttons. If the products to be grouped together as a Lot are ready to be read RFID tag reader 10, operator may press the "Yes" button.

Upon pressing the "Yes" button, device 16 may instruct RFID tag reader 10 to begin reading any RFID tags in its vicinity. RFID tag reader 10 may then read all available RFID tags in its vicinity and report the number of RFID tags read to device 16.

If desired, the operator may corroborate the number of tags read by RFID tag reader 10 by manually counting the products. However, this may not be required or desired if the number of products is too large for manual verification. Once the RFID tags on the desired products to be grouped together has been read, the operator may press the "End grouping of products" button. Device 16 then may display "Any additional information to be stored?" and display a "Yes" and "No" button. If "Yes" is pressed, the operator may input additional information such as the weather and the operator identification number.

In certain embodiments, rather than an operator manually pressing "Begin grouping of products" and "End grouping of products" buttons, software may automatically "begin" and "end" grouping of products. For example, the beginning and end of pick-up times for a truck may be known and programmed accordingly. Alternatively, software may be programmed to read RFID tags every time a pallet exceeds a certain weight as because a pallet would be grouped as a Lot when a particular weight is reached.

Device 16 may then instruct computer 14, via network 12, to generate a unique Lot #A1 208. All associated information may then be sent by device 16 to computer 14 via network 12, and saved in a repository 302 as shown in FIG. 3A.

In certain embodiments, computer 14 may then instruct RFID tag reader 10, via network 12, to write the unique Lot #A1 208 to each of the RFID tags grouped in that Lot. This may facilitate retrieval of desired historical information, such as weather and operator identification number, without having to store all the associated information on each of the tags by reading the Lot number stored in the RFID tag and retrieving the associated information from repository 302.

In a different embodiment, products A1 200 and B1 202 may be picked up at individual customer locations by the operator. The operator may also pick up product N1 204 from the drop-off center. The operator may classify both these as a single Event and using device 16, instruct computer 14, via network 12, that RFID tags read from individual customer locations and the drop off center using RFID reader(s) 10 be assigned Lot #A1 208. Then computer 14 may generate a Lot #A1 208.

Figure 3B:
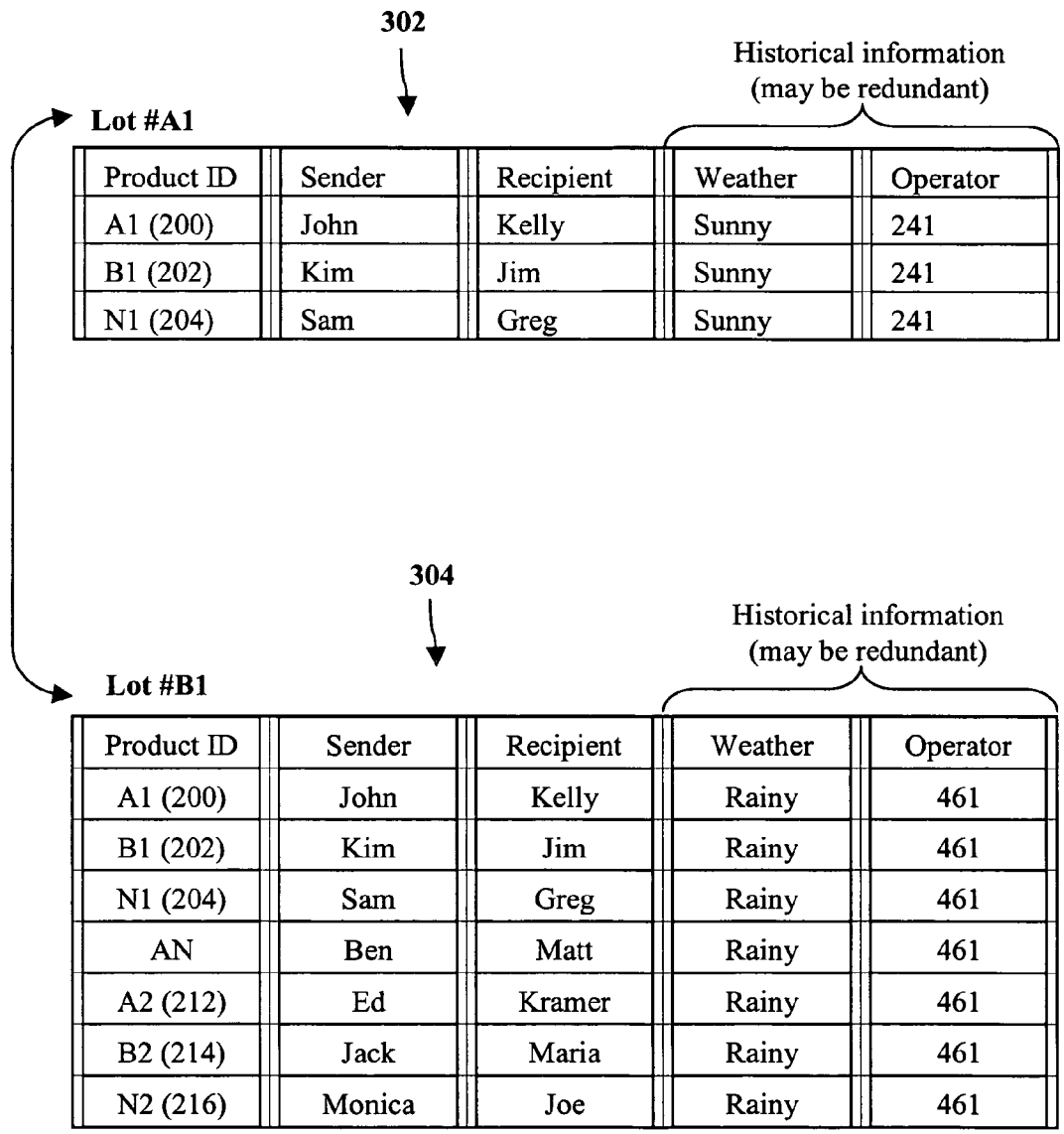
FIG. 3B shows an exemplary repository that may be used to monitor groups of products when Lots and individual products are grouped into a new Lot in accordance with one or more embodiments of the present invention.

In each scenario described above, information pertaining to products A1 200, B1 202, and N1 204, read by RFID tag reader(s) 10, may be transmitted to computer 14 and stored in a repository 302 (see FIG. 3A) associated therewith. As shown in FIG. 3A, repository 302 may contain historical information pertaining to Event A1 206, information pertaining to a plurality of individual products A1 200, B1 202, and N1 204 read by RFID tag reader(s) 10 (such as product identification number, sender, recipient, etc.), and any other desired information. One or more repositories may also be created based on repository 302 to reduce redundant information storage. For example, a separate repository containing historical information pertaining to Event A1 206 may be created and associated with repository 302 so that repository 302 does not store redundant historical information pertaining to Event A1 206. In addition, the reference numerals (e.g., (200), (202), etc.) shown in FIGS. 3A-3G are provided for clarification only, and need not be actually stored in repositories.

Subsequently, Lot #A1 208 may be grouped together with a plurality of other products associated with, for example, Lot #AN 210 and a plurality of other products A2 212, B2 214, and N2 216, that have not yet been assigned a Lot number, through or by Event B1 218 to form a new Lot #B1 220. A plurality of other products having different Lot numbers and a plurality of other products, that have not yet been assigned a Lot number, may also be grouped together through or by Event B1 218 to form Lot #B1 220.

For example, in one embodiment of the invention, an operator may use device 16 to instruct computer 14 that RFID tags read using RFID tag reader(s) 10 between a certain duration of time and/or within a certain location (i.e., during and/or after Event B1 218) are to be assigned Lot #B1 220. During this duration of time and/or within a certain location, information pertaining to all products contained in Lot #A1 208 and #AN 210 and to products A2 212, B2 214, and N2 216 may be read by RFID reader(s) 10. The information may then be transmitted to computer 14 via network 12. The information pertaining to all the individual products contained in Lot #B1 220 may then be stored in a newly created repository 304 that builds on repository 302.

Computer 14 may then check to see if any of the products that were read during and/or after Event B1 218 were previously read and stored in a repository. For example, computer 14 may recognize that RFID tags associated with products A1 200, B1 202, and N1 204 were previously assigned to Lot #A1 208 and stored in repository 302. Similarly, computer 14 may recognize that certain RFID tags were associated with Lot #AN 210. As such, repository 304 may be associated with repository 302 and a repository associated with Lot #AN 210.

Figure 3C:
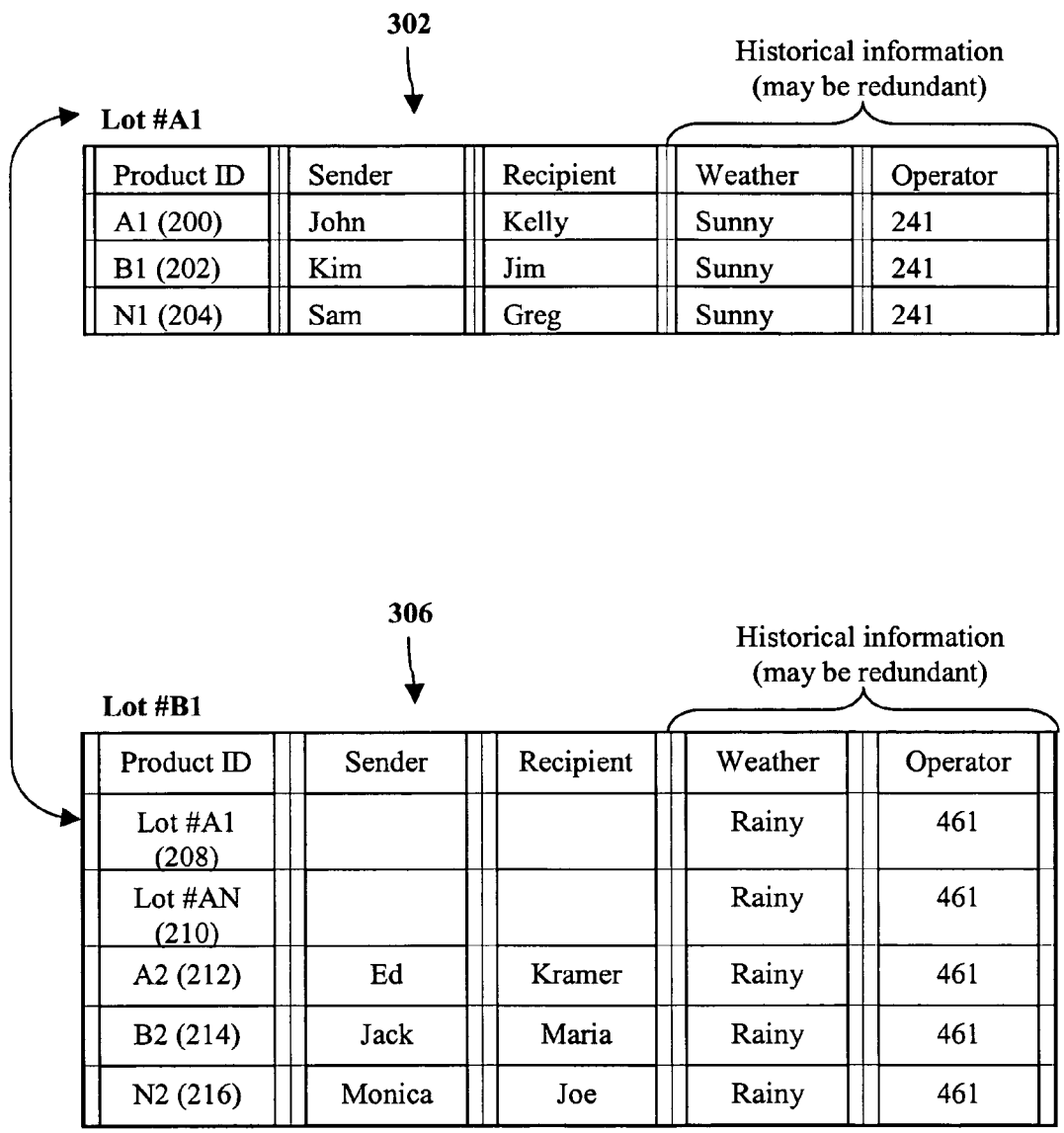
FIGS. 3C and 3D shows an exemplary repository that may be used to monitor groups of products when Lots are grouped into a new Lot in accordance with one or more embodiments of the present invention.
Figure 3D:
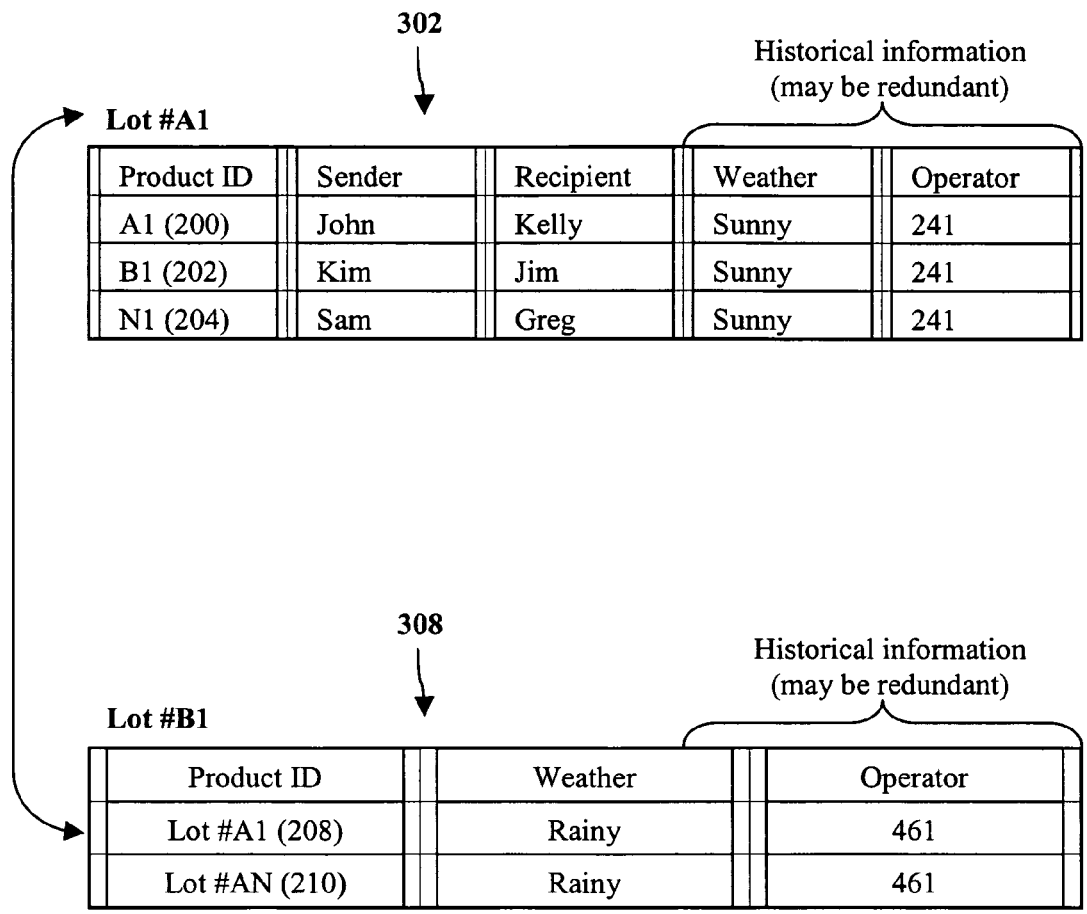

In an alternative embodiment and as shown in FIG. 3C, computer 14 may recognize, through suitable software, that products A1 200, B1 202, and N1 204 are associated with Lot #A1 208 and product AN is associated with Lot #AN 210. Computer 14 then may store in repository 306 information pertaining to Lots #A1 208 and #AN 210, information pertaining to a plurality of individual products A2 212, B2 214, and N2 216, and historical information related to Event B1 218 without storing information pertaining to the individual products associated with Lots #A1 208 and #AN 210 (e.g., products A1 200, B1 202, N1 204 and AN). As described above, repository 304 may be associated with repository 302 and a repository containing information pertaining to Lot #AN 210. As such, although repository 304 may not explicitly contain any information pertaining to individual products A1 200, B1 202, N1 204 and AN, any desired information pertaining to these products may be retrieved using repository 302 and repository containing information pertaining to Lot #AN 210.

In another aspect of the present invention, the operator may a priori recognize Lots #A1 208 and #AN 210 will be combined to form Lot #B1 220. Therefore, the operator may designate RFID tag reader(s) 10 to only read a plurality of individual products A2 212, B2 214, and N2 216, that have not yet been assigned a Lot number. In this instance, the operator may manually input through device 16 that Event B1 218 will aggregate Lots #A1 208 and #AN 210 in addition to products A2 212, B2 214, and N2 216. For example, after "End grouping of products" has been selected, device 16 may further contain a menu indicating "Additional products and/or Lot numbers to be associated with current Lot number?" and display "Yes" and "No" buttons. If the "Yes" button is selected, the operator may be able to manually input this information into device 16 via a keyboard or any other suitable input device. The information may then be transmitted to computer 14, via network 12, and computer 14 may store in repository 306 information pertaining to Lot #A1 208 and #AN 210, information pertaining to products A2 212, B2 214, and N2 216, and historical information related to Event B1 218. Although a different method of reading the RFID tags was utilized, the resulting repository 306 is identical as obtained in the previous embodiment. As described above, repository 306 may then be associated with repository 302 and a repository containing information pertaining to Lot #AN 210 (not shown).

If products A2 212, B2 214, and N2 216 were not grouped through or by Event B1 218, reading of the RFID tags may not be necessary. In this case, an operator may a priori be aware of the fact that Lots #A1 208 and #AN 210 come together within a certain time frame to be grouped together. As such, when device 16 displays "Do you wish to scan items?" along with "Yes and "No" buttons, the operator may select the "No" button. Device 16 may display "Input products and/or Lot numbers to be associated with current Lot number?" and display an input screen along with a "Finish" button. After all desired products and/or Lot numbers (Lot #A1 208 and #AN 210) have been inputted, the operator may select the "Finish" button. Device 16 may then display "Any additional information to be stored?" along with "Yes" and "No" buttons. If "Yes" is pressed, the operator may input additional information such as the weather and the operator identification number. Device 16 may then instruct computer 14, via network 12, that a new Lot #B1 220 having Lot #A1 208 and #AN 210 may be created. In return, a new repository 308 having Lot #A1 208 and #AN 210 may be created, associated with repository 302 and a repository for Lot #AN 210, and stored in storage 114 (see FIG. 3D).

Additional grouping of Lot #B1 220 may occur through and/or by additional Events to form a new Lot #(N-1)1 222, wherein new repositories pertaining to new Lots may be created and linked to previously created repositories, in a same or similar manner as described above. Lot #(N-1)1 222 may then be grouped together, for example, with a plurality of other products having Lot #(N-1)N 224 and a plurality of other products AN 226, BN 228, and NN 230, that have not yet been assigned a Lot number, through or by Event N1 232 to form a new Lot #N1 234. A plurality of other products having different Lot numbers and a plurality of other products, that have not yet been assigned a Lot number, may also be grouped together through or by Event N1 232 to form Lot #N1 234. A new repository pertaining to Lot #N1 234 may be created and associated to previously created repositories, in a same or similar manner as described above.

Figure 2B:
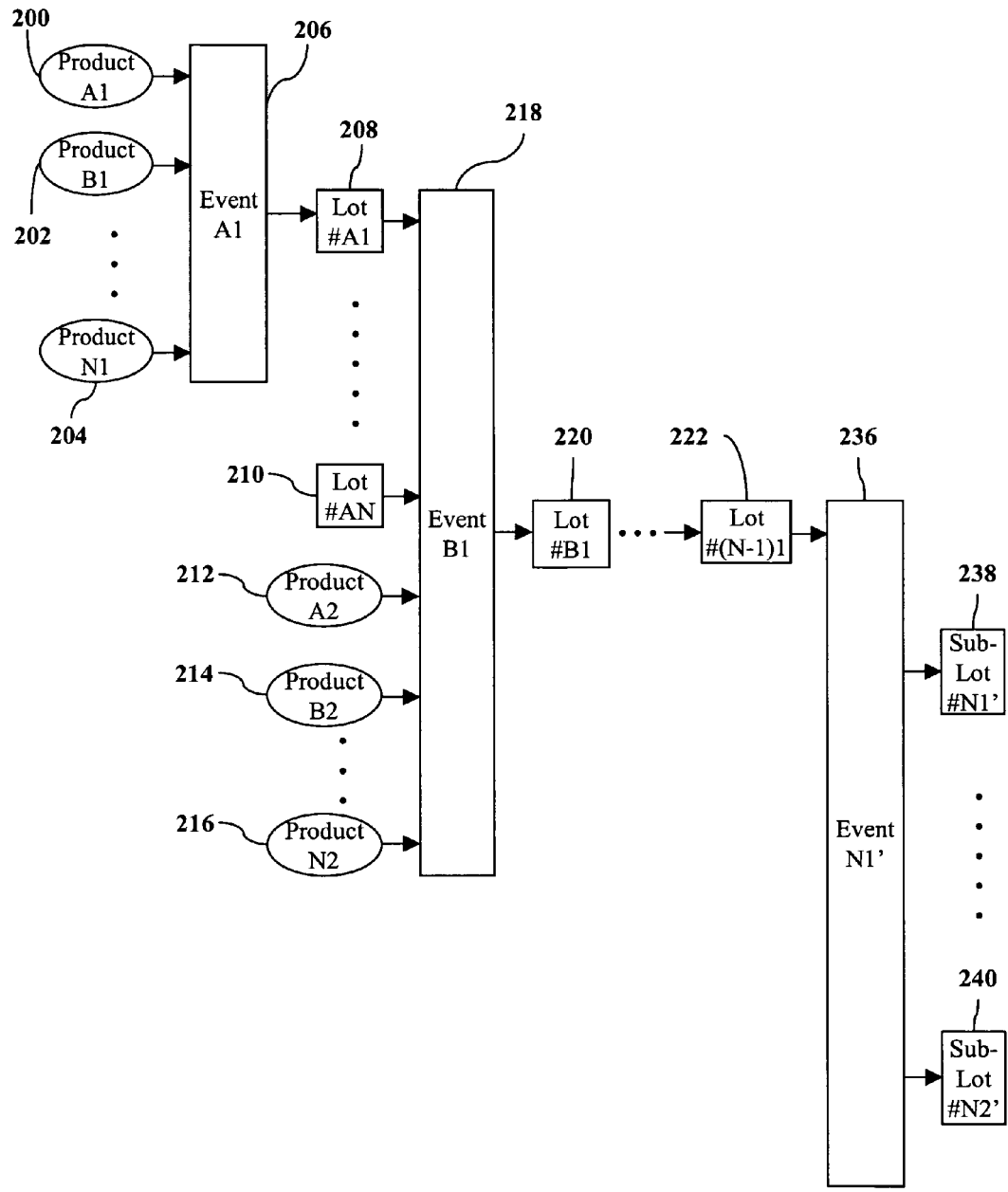
FIG. 2B is a method of grouping products and monitoring groups of products in accordance with another embodiment of the present invention.

FIG. 2B shows another embodiment of a method of grouping products and monitoring groups of products. In the embodiment of FIG. 2B, rather than aggregating products and/or Lots, Lots may be sub-divided into smaller Sub-Lots. In general, groups of products having a Lot number may be subdivided into a plurality of Sub-Lots each having a plurality of individual products.

As shown in FIG. 2B, products may be grouped and monitored, in a same or similar manner, as described above, in connection with FIG. 2A, to form Lot #(N-1)1 222. At this point, Lot #(N-1)1 222 may encounter Event N1' 236, which may require subdividing Lot #(N-1)1 222 into, for example, Sub-Lots #N1' 238 and #N2' 240, each having a smaller number of individual products than Lot #(N-1)1 222. Lot #(N-1)1 222 may be subdivided into any number of desired Sub-Lots.

As such, an operator may, for example, using device 16, read RFID tags on products associated with Sub-Lot #N1' 238 with RFID tag reader(s) 10 between a duration of time and/or at a certain location in a same or similar manner as described above. For example, Sub-Lot #N1' 238 may include products A1 200, B1 202, and A2 212 in a box, a bag, a truck, or in close proximity with each other. Information pertaining to products contained in Sub-Lot #N1' 238 may then be transmitted to computer 14. Computer 14 may then assign Sub-Lot #N1' 238 and store information pertaining to products A1 200, B1 202, and A2 212 in repository 310. Computer 14 may then recognize that products A1 200, B1 202, and A2 212 were previously stored in repositories pertaining to Lot #A1 208, Lot #B1 220, and Lot #(N-1)1 222. Computer 14 may then associate repository 310 with repositories pertaining to Lot #A1 208, Lot #B1 220, and Lot #(N-1)1 222 (see FIG. 3E).

Similarly, an operator may, for example, using device 16, read RFID tags on products associated with Sub-Lot #N2' 240 with RFID tag reader(s) 10 between a duration of time and/or at a certain location in a same or similar manner as described above. For example, Sub-Lot #N2' 240 may include products N1 204, B2 214, and N2 216 in a box, a bag, a truck, or in close proximity with each other. Information pertaining to products contained in Sub-Lot #N2' 240 may then be transmitted to computer 14. Computer 14 may then assign Sub-Lot #N2' 240 and store information pertaining to products N1 204, B2 214, and N2 216 in repository 312. Computer 14 may then recognize that products N1 204, B2 214, and N2 216 were previously stored in repositories pertaining to Lot #A1 208, Lot #AN 210, Lot #B1 220, and Lot #(N-1)1 222. Computer 14 may then associate repository 312 with repositories pertaining to Lot #A1 208, Lot #AN 210, Lot #B1 220, and Lot #(N-1)1 222 (see FIG. 3F).

Events A1 206, B1 218, and N1' 236 may be or represent, for example, gathering products together within a certain physical area, separating a portion of groups of products, passing products through a certain area, placing products in a certain area for a certain range of time, and/or products being in proximity to other products or groups of products having similar characteristics.

Figure 2C:
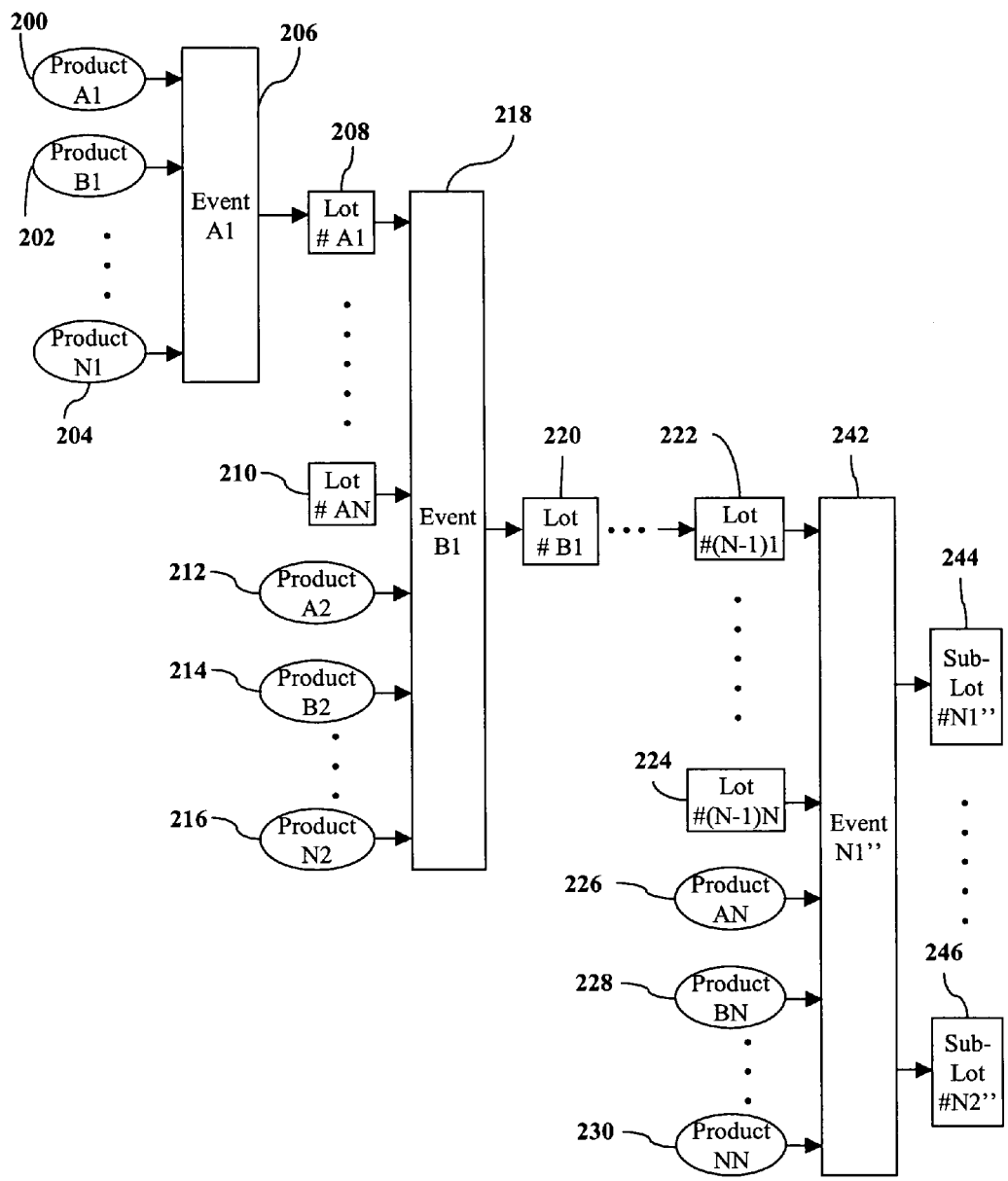
FIG. 2C is a method of grouping products and monitoring groups of products in accordance with yet another embodiment of the present invention.

FIG. 2C shows another method of grouping products and monitoring groups of products, wherein products and/or Lots are grouped and sub-divided into smaller Sub-Lots through or by a single Event, in accordance with yet another embodiment of the present invention. In general, a plurality of different Lots and a plurality of individual products, that have not yet been assigned a Lot number, may come together and be sub-divided into a plurality of Sub-Lots through or by a single Event.

As shown in FIG. 2C, products may be grouped and monitored, in a same or similar manner as described above with reference to FIGS. 2A and 2B, to form Lot #(N-1)1 222. Lot #(N-1)1 222 may then be come together (be grouped) with one or more other Lots (e.g. Lot #(N-1)N 224) and/or one or more products AN 226, BN 228, and NN 230, that have not yet been assigned a Lot number, and sub-divided through or by Event N1" 242 to form, for example, Sub-Lots #N1" 244 and #N2" 246. A plurality of other products having different Lot numbers and a plurality of other products, that have not yet been assigned any Lot numbers, may also be grouped together and subdivided through or by Event N1"242. Sub-Lots #N1" 244 and #N2" 246 may have a smaller, equal, or larger number of products than Lot #(N-1)1 222 and #(N-1)N 224.

An operator may, for example, using a device 16, read RFID tags on products associated with Sub-Lot #N1" 244 with RFID tag reader(s) 10 between a duration of time and/or at a certain location in a same or similar manner as described above. For example, Sub-Lot #N1" 244 may contain products A1 200, B1 202, N1 204, A2 212, B2 214, N2 216, AN 226, BN 228, and NN 230 in a box, a bag, a truck, or in close proximity with each other. Information pertaining to products contained in Sub-Lot #N1" 244 may then be transmitted to computer 14. Computer 14 may then assign Sub-Lot #N1" 244 and store information pertaining to products A1 200, B1 202, N1 204, A2 212, B2 214, N2 216, AN 226, BN 228, and NN 230 in repository 314. Computer 14 may then recognize that products A1 200, B1 202, N1 204, A2 212, B2 214, N2 216, AN 226, BN 228, and NN 230 were previously stored in repositories pertaining to Lot #A1 208, Lot #B1 220, and Lot #(N-1)1 222. Computer 14 may then associate repository 314 with repositories pertaining to Lot #A1 208, Lot #B1 220, and Lot #(N-1)1 222 (see FIG. 3G).

Similarly, an operator may, for example, using a device 16, read RFID tags on products associated with Sub-Lot #N2" 246 with RFID tag reader(s) 10 between a duration of time and/or at a certain location in a same or similar manner as described above. For example, Sub-Lot #N2" 246 may include products included in Lots #AN 210, #(N-1)1 222, and #(N-1)N 224 in a box, a bag, a truck, or in close proximity with each other. Information pertaining to products contained in Sub-Lot #N2" 246 may then be transmitted to computer 14. Computer 14 may then assign Sub-Lot #N2" 246 and store information pertaining to products included in Lots #AN 210, #(N-1)1 222, and #(N-1)N 224 in repository 316. Computer 14 may then recognize that products included in Lots #AN 210, #(N-1)1 222, and #(N-1)N 224 were previously stored in repositories pertaining to Lots #AN 210, #B1 220, #(N-1)1 222, and #(N-1)N 224. Computer 14 may then associate repository 316 with repositories pertaining to Lots #AN 210, #B1 220, #(N-1)1 222, and #(N-1)N 224 (see FIG. 3H).

Events, as utilized herein, may refer to any known events. Events A1 206, B1 218, and N1" 242 may be or represent, for example, gathering products together within a certain physical area, separating a portion of groups of products, passing products through a certain area, placing products in a certain area for a certain range of time, products being in proximity to other products or groups of products having similar characteristics, and/or products going through a similar handling or manufacturing process.

The repositories shown in FIGS. 3A-3H exemplify a portion of a virtually infinite amount of information that may be stored in repositories. Accordingly, these examples should not be construed as limiting the repositories to storing only the information shown herein. In addition, repositories shown in FIGS. 3A-3H may be maintained in a software product such as Microsoft Access, software from Oracle Corp., and the like. Such database software products may allow simple and efficient monitoring of groups of products in accordance with an embodiment of the present invention.

For example, in FIGS. 2A-2C, Lot #B1 220 can be related back to Lot #A1 208 and #AN 210. Consequently, information pertaining to a particular product, for example, product B1 202, can be retrieved. This may eliminate the need to append (write) new historical information to each and every RFID tag that encounters a new event. Rather, the information may be stored once in a repository and referred by an operator for all products that have encountered that specific event.

Thus, the present invention may provide significant advantages in simplifying data management for monitoring groups of products.

Aspects of one or more embodiments of the present invention can be illustrated by way of the following example.

As a first example, the following set of events may generate a repository shown in FIG. 4A. An RFID tag #RF112 may be affixed to a package at a mail drop-off location #41 in Ithaca, N.Y. at 7:04 am Drop-off location #41 may be equipped with a RFID tag reader 10 capable of writing to the RFID tag #112 the time and date of drop-off. At 3:02 pm, the package, having the RFID tag #RF112 attached thereto, may be grouped with 80 other packages, each having a unique RFID tag, and picked up by a truck #42. An operator #441 may use a customized handheld device 16 and instruct RFID reader 10 mounted on truck #42 to read the RFID tags on the 81 packages. Using device 16 and via a network 12, operator #441 may transmit to computer 14 commands instructing that the 81 RFID tags that were read by RFID reader 10 will be assigned as a Lot. RFID tag information (read by RFID tag reader 10) and historical information (manually input by operator #441 into device 16) may also be transmitted to computer 14 via network 12. Upon receiving such commands and information from device 16 and RFID tag reader 10 on truck #42, computer 14 may, using at least one software product, 1) determine information pertaining to any of these products were not previously stored in computer 14; 2) generate a unique LOT #495294; 3) create a corresponding repository 402; and/or 4) store the transmitted information.

As shown in FIG. 4A, the following information pertaining to LOT #495294 may be stored in the repository: 1) LOT #495294 contains RFID tag#RF112 and 80 other packages each having a unique RFID tag number; 2) LOT #495294 was collected by operator #441; 3) LOT #495294 was picked up for transfer at 3:02 pm in truck #42 on Jul. 8, 2005; 4) it was sunny, clear, and 104 degrees Fahrenheit. In addition, the individual drop-off time written into the tags may also be stored in repository 402.

LOT #495294 may then arrive at Ithaca airport at 3:43 p.m. Ithaca airport may also be equipped with one or more RFID readers, which updates the arrival information to repository 402 pertaining to LOT #495294 (see FIG. 4A).

Subsequently, the following set of events may generate a repository shown in FIG. 4B. The package may then be loaded onto plane #20. In addition, LOT #492042, LOT #3240593, LOT #234927, LOT #2394982, and LOT #2394873 may also be loaded onto plane #20. An operator #622 may use a customized handheld device 16 and instruct RFID reader 10 mounted on plane #20 to read the RFID tags on plane #20. Using device 16 and via a network 12, operator #622 may transmit to computer 14 commands instructing the RFID tags that were read by RFID reader 10 on plane #20 will be assigned as a Lot. RFID tag information (that were read by RFID tag reader 10 on plane #20) and historical information (manually inputted by operator #622 into device 16) may also be transmitted to computer 14 via network 12. Upon receiving such commands and information from device 16 and RFID tag reader 10, computer 14 may, using at least one suitable software, 1) determine that the products in the airplane make up LOT #492042, LOT #3240593, LOT #234927, LOT #2394982, and LOT #2394873; 2) generate a Master LOT #39434939-003; 3) create a corresponding repository 404; and store the transmitted information. In addition, computer 14 may also associate repository 404 pertaining to Master LOT #39434939-003 with repositories pertaining to LOT #492042, LOT #3240593, LOT #234927, LOT #2394982, and LOT #2394873.

As shown in FIG. 4B, the following information pertaining to Master LOT #39434939-003 may be stored in computer 14: 1) Master LOT #39434939-003 contains products from LOT #495294, LOT #492042, LOT #324059, LOT #234927, LOT #234982, and LOT #239487; 2) Master LOT #39434939-003 was collected by operator #622; 3) Master LOT #39434939-003 was loaded onto plane #20 at 4:12 pm on Jul. 8, 2005; 4) it was sunny, clear, and 74 degrees Fahrenheit; 5) plane #20 departed Ithaca, N.Y. at 4:59 pm to travel from the Ithaca airport to LaGuardia airport (LGA) in New York City. Upon landing at LGA at 6:23 pm, the arrival information may be read by one or more RFID tag readers at LGA and repository 404 pertaining to Master LOT #39434939-003 may be updated.

It should be noted that in Master LOT #39434939-003 (see FIG. 4B), information pertaining to individual products need not be stored in computer 14. Rather, only the associated LOT numbers can be stored in computer 14. If necessary, the individual RFID tag numbers may be accessed at a subsequent time by referencing information stored in the computer associated with any of the previous LOTS. For example, if information, such as pick-up time, pertaining to the package with the RFID tag #RF112 is desired, repository 402 pertaining to LOT #495294 may be referenced as they will be associated with each other. Using a Structured Query Language, for example, the pick-up time may be easily ascertained.

However, if desired, information pertaining to individual products may be stored in the computer as well. As above, the historical information associated with each individual RFID tag numbers may be looked up by referencing information stored in the computer associated with any of the previous LOTS.

Subsequently, the following set of events may generate a repository shown in FIG. 4C. At LGA, Master LOT #39434939-003 may be sub-divided into a number of different Sub-LOTS and loaded into various trucks. For example, a part of the Master LOT #39434939-003 may be loaded onto truck #2000 for delivery. An operator #111 may use a customized handheld device 16 and instruct RFID reader 10 mounted on truck #2000 to read the RFID tags on truck #2000. Using device 16 and via a network 12, operator #111 may transmit to computer 14 commands instructing the RFID tags that were read by RFID reader 10 on truck #2000 will be assigned as a Lot. RFID tag information (that were read by RFID tag reader 10 on truck #2000) and historical information (manually inputted by operator #111 into device 16) may also be transmitted to computer 14 via network 12. Upon receiving such commands and information from device 16 and RFID tag reader 10, computer 14 may, using at least one suitable software package, 1) determine that the products in truck #2000 previously belonged to Master LOT #39434939-003; 2) generate a Sub-LOT #2257936-220; 3) create a corresponding repository 406; and store the transmitted information. In addition, computer 14 may also associate repository 406 pertaining to Sub-LOT #2257936-220 with repository 404 pertaining to Master LOT #39434939-003.

Figure 4C:

As shown in FIG. 4C, the following information pertaining to Sub-LOT #2257936-220 may be stored in computer 14: 1) Sub-LOT #2257936-220 contains several individual products, each respectively having RFID tag #331, #112, #215, #332, #492, and #927; 2) Sub-LOT #2257936-220 was loaded onto truck #2000 by operator #111; 3) Sub-LOT #2257936-220 was loaded onto truck #2000 at 6:55 pm on Jul. 8, 2005; and 4) it was dark and 72 degrees Fahrenheit.

Truck #2000 may then depart LGA the following morning on Jul. 9, 2005 to travel to local delivery destinations in northern New Jersey. Upon delivery of the individual packages, RFID tag reader may read the RFID tag associated with the individual package and transmit the delivery time and date to computer 14 via a wireless network and repository 406 pertaining to Sub-LOT #2257936-220 may be updated to reflect that the packages has been delivered (see FIG. 4C).

To illustrate at least one advantageous aspect of the present invention, package having RF tag #112 may have been delivered at 8:02 am on Jul. 9, 2005. Upon receipt of the package, the recipient may find that the package contained seafood, but the seafood was spoiled. The recipient may then complain that the seafood spoiled due to mishandling on the delivery carrier. However, by referencing the historical information associated with the package containing RF tag #112, repository 402 (see FIG. 4A) may show that the package was deposited early in the morning at 7:04 am and left in 104° F. temperature until 3:02 pm Therefore, the delivery carrier may address the recipient's concerns in a responsive and timely manner.

As exemplified herein, by monitoring the groups of products as Lots after certain Events are encountered, data management may be simplified. Furthermore, obtaining information about a particular product can also be easily performed by using repositories that are linked to repositories pertaining to previous Lots, which can ultimately be traced back to an individual product.

Figure 5:
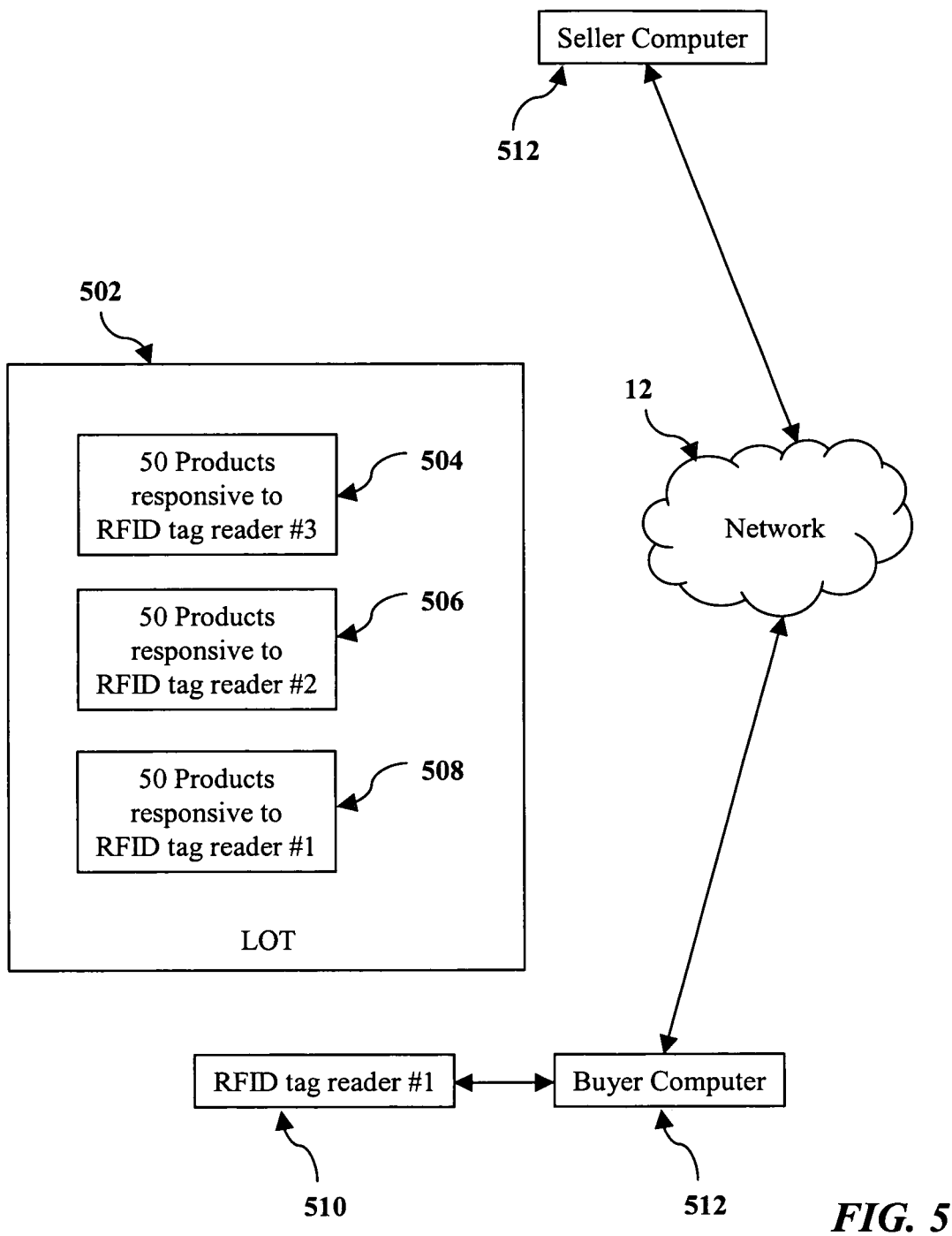
FIG. 5 shows a schematic diagram of how information transfer and management among various entities may be simplified by monitoring groups of products in accordance with one or more embodiments of the present invention.

In addition, information transfer and management among various entities may be simplified. For example, certain RFID tags may only be accessible (read) by certain RFID tag readers. This may be due to certain RFID tags being responsive to only certain radio frequency spectrum. For instance, as shown in FIG. 5, a Lot 502 received by a buyer may contain 100 products 504 and 506 that cannot be read by a RFID tag reader #1 510 that is used by the buyer, and also contain 50 products 508 having RFID tags that can be read by RFID tag reader #1 510 available to the buyer. Although the buyer may read only 50 RFID tags associated with the 50 products 508, the seller may provide from seller computer 512 to buyer computer 514, through software access and/or via network 12, information pertaining to the 100 remaining products 504 and 506 contained in Lot 502. As such, monitoring groups of products in accordance with one or more embodiments of the present invention may facilitate information transfer and management among various entities. Seller computer 512 and buyer computer 514 may be a standard general-purpose computer. RFID tag reader #1 510 may be, for example, a Socket RFID Reader Card RF5400-542, a Visonic TIABKT2 Stand-Alone Proximity Reader, or an Isonas Wireless IP Proximity Reader. These exemplary devices may be modified as necessary to operate in accordance with one or more embodiments of the present invention.

Aspects of one or more embodiments of the present invention can be further illustrated by way of another example. In a recycling operation, many recyclable products may be sent to a baling facility, where the recyclable products are sorted, compressed into bales, and sold. Each of the recyclable products may have RFID tags associated with them. However, some RFID tags may only be read by certain RFID tag readers emitting a particular spectrum of the radio frequency. For example, a first RFID tag reader may only be read by RFID tag readers emitting radio frequencies of 125-148 kHz (low) while a second RFID tag reader may only be read by RFID tag reader emitting a radio frequency of 13.56 MHz (medium). Similarly, a third RFID tag may only be read by RFID tag readers emitting a radio frequency of 915 MHz (high). Regardless, recyclable products containing various types of RFID tags may all be compressed into a single bale.

Figure 6:
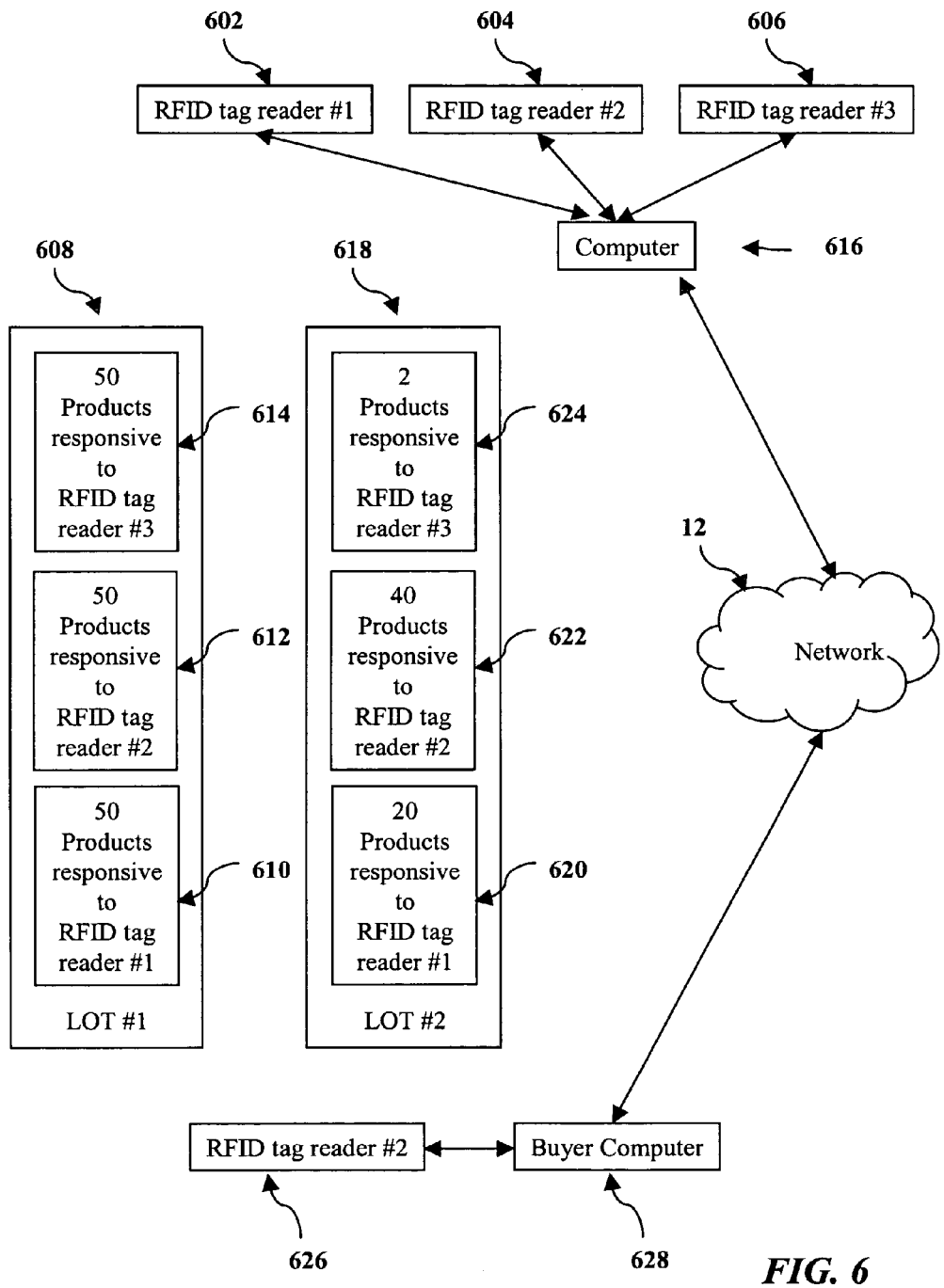
FIG. 6 shows a schematic diagram of information transfer and management between a seller (or a baler) and a buyer by monitoring groups of products in accordance with an embodiment of the present invention.

As shown in FIG. 6, the baling facility may contain a plurality of RFID readers 602, 604, and 606 capable of reading all such RFID tags. Thus, the baling facility may, after producing a bale 608 with products containing RFID tags, read all active RFID tags contained in bale 608 and assign bale 608 a LOT #1. For example, the RFID tag readers may read 50 low frequency RFID tags, 50 medium frequency RFID tags, and 50 high frequency RFID tags, respectively associated with products 610, 612, and 614. The information read by the RFID tag readers 602, 604, and 606 may be stored in a repository in a general purpose computer 616. Historical information, such as compression force used during baling, operator of the baler, length of storage of the bale, and the like, may also be stored in computer 616.

A second bale 618 assigned a LOT #2 may also be produced. The second bale 618 having LOT #2 may contain 20 low frequency RFID tags, 40 medium frequency RFID tags, and 2 high frequency RFID tags, respectively associated with products 620, 622, and 624. The information read by the RFID tag readers 602, 604, and 606 for the second bale 618 may be stored in a repository in computer 616. Historical information, such as compression force used during baling, operator of the baler, length of storage of the bale, and the like, may also be stored in computer 616.

Bales 608 and 618 may be delivered to a (potential) buyer, who may only have a medium frequency (13.56 MHz) RFID tag reader #2 626. To identify the purchased bales, the (potential) buyer may read bales 608 and 618 with the medium frequency RFID tag reader #2 626. For example, all 50 unique RFID tags associated products 612 in bale having LOT #1 608 may be read. By identifying that the particular bale 608 is assigned a LOT #1, the baler may then allow the (potential) buyer to view, on buyer computer 628, information pertaining to the remaining 100 products 610 and 614 contained in bale 608 through a software access via network 12. The (potential) buyer may then advantageously be able to determine the full content of bale 608, although only a portion of the RFID tags associated bale 608 were able to be scanned by the (potential) buyer. Additional historical information, such as compression force used during baling, operator of the baler, length of storage of the bale, and the like, may all be obtained, if permitted by the baler and/or if desired by the (potential) buyer. Furthermore, the (potential) buyer may also be reasonably reassured that bale having LOT #1 608 arrived without significant damage after the baling operation, as all 50 medium frequency tags associated with products 612 were read, which is in agreement with the repository provided by the baler.

However, supposing that only 15 RFID tags may be read when reading RFID tags contained in bale having LOT #2 618. Although five RFID tags are unreadable and/or missing, the (potential) buyer may nevertheless be able to determine that bale 618 should be identified as having LOT #2 due to the 15 unique RFID tags read by RFID reader #2 626. By identifying that bale 618 is assigned a LOT #2, the baler may then allow the (potential) buyer to view, on buyer computer 628, information pertaining to the remaining 47 products contained in bale 618 through a software access via network 12. The (potential) buyer may then be able to determine the full content of bale 618, although only a small portion of the bale was identified. Additional historical information, such as compression force used during baling, operator of the baler, length of storage of the bale, and the like, may all be obtained, if permitted by the baler and/or if desired by the (potential) buyer. Furthermore, the (potential) buyer may then be able to assess whether bale 618 meets desired criterion and inquire if any damage occurred after the baling operation since several RFID tags that should have been read were not read.

In contrast, if a single unique RFID were attached to each bale, the baler may have to determine, for each bale, which buyer possesses which RFID tag reader for correct labeling. This may be a labor-intensive process adding further costs. Furthermore, attaching RFID tags to bales, which can sometimes weigh several tons, before a bale is shipped out to a buyer may pose significant safety hazards. In addition, attaching a single RFID tag to label a bale may not enable the buyer to determine the quality of the bale as demonstrated above.

As described above, creating and monitoring products in Lots accordance with the present invention facilitates the monitoring of products over time without having to track each individual product that is part of the Lot over time. Embodiments of the present invention may further allow obtaining historical information associated with the products by monitoring the historical information associated with the Lots. This may overcome the limitation of having to write or update historical information to each individual product. Furthermore, embodiments of the present invention may be used to overcome the limitation of having to add an RFID tag to represent and monitor a group of products.

Upon review of the description, embodiments, and example of the present invention, those skilled in the art will understand that modifications and equivalent substitutions may be performed in carrying out the invention without departing from the essence and spirit of the invention.

For example, although the specification describes Lot numbers being stored in repositories or RFID tags, other suitable means for storing Lot numbers may be envisioned. For example, Lot number may be stored in data queries, other semiconductor devices such as flash memory devices, physical paper entries, and the like. Thus, the invention is not meant to be limiting by the embodiments and example explicitly described above, and is limited only by the claims that follow.

What is claimed is:

1. A method for monitoring one or more products, comprising:
   a) grouping the one or more products into a first lot, substantially each of the one or more products having a radio frequency identifier (RFID) tag;
   b) reading, utilizing a first radio frequency identifier (RFID) reader device, data stored on the RFID tag associated with the one or more products of the first lot;
   c) storing the data associated with the one or more products of the first lot in a first repository;
   d) storing at least one additional data associated with the first lot in the first repository to generate a first collective data; and
   e) retrieving data pertaining to one or more products of the first lot from the first collective data to monitor the one or more products in the first lot.

2. The method of claim 1, further comprising:
   f) grouping one or more additional products into a second lot, substantially each of the one or more additional products having a radio frequency identifier (RFID) tag;
   g) reading, utilizing a second radio frequency identifier (RFID) reader device, data stored on the RFID tag associated with the one or more products of the second lot;
   h) storing the data associated with the one or more products of the second lot in a second repository;
   i) storing at least one additional data associated with the second lot in the second repository to generate a second collective data;
   j) retrieving data pertaining to one or more products of the first and/or second lots from the first and/or second collective data to monitor the one or more products in the first and/or second lots.

3. The method of claim 2, wherein the first RFID reader device and the second RFID reader device are the same.

4. The method of claim 2, further comprising:
   k) grouping the first lot with the second lot to obtain a master lot;
   l) storing information pertaining to the first and second lots in a master repository;
   m) storing at least one additional data associated with the master lot in the master repository to generate a master collective data;
   n) associating the master repository with the first and second repositories; and
   o) retrieving data pertaining to one or more products of the master lot from the master collective data to monitor the one or more products in the master lot.

5. The method of claim 1, further comprising:
   f) grouping the first lot with one or more additional products to obtain a master lot, substantially each of the one or more additional products having a radio frequency identifier (RFID) tag;
   g) reading, utilizing a second RFID reader device, data stored on the RFID tag associated with the one or more additional products;
   h) storing the data read from the RFID tag associated with the one or more additional products in a master repository;
   i) storing information pertaining to the first lot in the master repository;
   j) storing at least one additional data associated with the master lot in the master repository to generate a master collective data;
   k) associating the master repository with the first repository; and
   l) retrieving data pertaining to one or more products of the master lot from the master collective data to monitor the one or more products in the master lot.

6. The method of claim 5, wherein the first RFID reader device and the second RFID reader device are the same.

7. The method of claim 1, further comprising:
   f) sub-dividing the first lot to obtain at least one sub-lot, wherein the sub-lot has a smaller number of products than the first lot;
   g) reading, utilizing a second RFID reader device, data stored on the RFID tag associated with the one or more products of the sub-lot;
   h) storing the data read from the RFID tag associated with the one or more additional products in a sub-lot repository;
   i) storing at least one additional data associated with the sub-lot in the sub-lot repository to generate a sub-lot collective data;
   j) associating the sub-lot repository with the first repository; and
   k) retrieving data pertaining to one or more products of the sub-lot from the sub-lot collective data to monitor the one or more products in the sub-lot.

8. The method of claim 1, wherein the method for monitoring one or more products comprises a computer-implemented method, and
   wherein a processor groups the one or more products into the first lot, stores the data associated with the one or more products of the first lot in the first repository, stores the at least one additional data associated with the first lot in the first repository to generate the first collective data, and retrieves the data pertaining to the one or more products of the first lot from the first collective data to monitor the one or more products in the first lot.

9. A method for monitoring one or more products, comprising:
   a) grouping a first product having a first RFID tag responsive to a first frequency range and a second product having a second RFID tag responsive to a second frequency range to obtain a lot;
   b) reading, utilizing a first RFID reader device emitting at least one frequency in the first frequency range and a second RFID reader device emitting at least one frequency in the second frequency range, data stored on the first and second RFID tags;
   c) storing the data associated with the first and second products in a repository;
   d) storing at least one additional data associated with the lot in the repository to generate a collective data;
   e) reading, utilizing a first RFID reader device emitting at least one frequency in the first frequency range, data stored on the first RFID tag;
   f) identifying the lot based on the data read in step e); and
   g) retrieving data pertaining to the first product, the second product, or the first and second products from the collective data to monitor the one or more products in the lot.

10. The method of claim 9, wherein the method for monitoring one or more products comprises a computer-implemented method, and
   wherein a processor groups the first product having the first RFID tag responsive to the first frequency range and the second product having the second RFID tag responsive to the second frequency range to obtain the lot, stores the data associated with the first and second products in the repository, stores the at least one additional data associated with the lot in the repository to generate the collective data, identifies the lot based on the data read, and retrieves the data pertaining to the first product, the second product, or the first and second products from the collective data to monitor the one or more products in the lot.

11. A computer readable medium storing computer executable instructions that, when executed by a processor, cause the processor to perform a method for monitoring one or more products, the method comprising:
   a) grouping the one or more products into a first lot, substantially each of the one or more products having a radio frequency identifier (RFID) tag;
   b) reading, utilizing a first radio frequency identifier (RFID) reader device, data stored on an RFID tag associated with the one or more products of the first lot;
   c) storing the data associated with the one or more products of the first lot in a first repository;
   d) storing at least one additional data associated with the first lot in the first repository to generate a first collective data; and
   e) retrieving data pertaining to one or more products of the first lot from the first collective data to monitor the one or more products in the first lot.

12. The computer readable medium of claim 11, wherein the method further comprises:
   f) grouping one or more additional products into a second lot, substantially each of the one or more additional products having a radio frequency identifier (RFID) tag;
   g) reading, utilizing a second radio frequency identifier (RFID) reader device, data stored on the RFID tag associated with the one or more products of the second lot;
   h) storing the data associated with the one or more products of the second lot in the second repository;
   i) storing at least one additional data associated with the second lot in the second repository to generate a second collective data; and
   j) retrieving data pertaining to one or more products of the first and/or second lots from the first and/or second collective data to monitor the one or more products in the first and/or second lots.

13. The computer readable medium of claim 12, wherein the first RFID reader device and the second RFID reader device are the same.

14. The computer readable medium of claim 12, wherein the method further comprises:
   k) grouping the first lot with the second lot to obtain a master lot;
   l) storing information pertaining to the first and second lots in a master repository;
   m) storing at least one additional data associated with the master lot in the master repository to generate a master collective data;
   n) associating the master repository with the first and second repositories; and
   o) retrieving data pertaining to one or more products of the master lot from the master collective data to monitor the one or more products in the master lot.

15. The computer readable medium of claim 11, wherein the method further comprises:
   f) grouping the first lot with one or more additional products to obtain a master lot, substantially each of the one or more additional products having a radio frequency identifier (RFID) tag;
   g) reading, utilizing a second RFID reader device, data stored on the RFID tag associated with the one or more additional products;
   h) storing the data read from an RFID tag associated with the one or more additional products in a master repository;
   i) storing information pertaining to the first lot in the master repository;
   j) storing at least one additional data associated with the master lot in the master repository to generate a master collective data;
   k) associating the master repository with the first repository; and
   l) retrieving data pertaining to one or more products of the master lot from the master collective data to monitor the one or more products in the master lot.

16. The computer readable medium of claim 15, wherein the first RFID reader device and the second RFID reader device are the same.

17. The computer readable medium of claim 11, wherein the method further comprises:
   f) sub-dividing the first lot to obtain at least one sub-lot, wherein the sub-lot has a smaller number of products than the first lot;
   g) reading, utilizing a second RFID reader device, data stored on the RFID tag associated with the one or more products of the sub-lot;
   h) storing the data read from the RFID tag associated with the one or more products in a sub-lot repository;
   i) storing at least one additional data associated with the sub-lot in the sub-lot repository to generate a sub-lot collective data;

j) associating the sub-lot repository with the first repository; and k) retrieving data pertaining to one or more products of the sub-lot from the sub-lot collective data to monitor the one or more products in the sub-lot.

18. The computer readable medium of claim 17, wherein the first RFID reader device and the second RFID reader device are the same.

19. A computer readable medium storing computer executable instructions that, when executed by a processor, cause the processor to perform a method for monitoring one or more products, the method comprising:

a) grouping a first product having a first RFID tag responsive to a first frequency range and a second product having a second RFID tag responsive to a second frequency range to obtain a lot;

b) reading, utilizing a first RFID reader device emitting at least one frequency in the first frequency range and a second RFID reader device emitting at least one frequency in the second frequency range, data stored on the first and second RFID tags;

c) storing the data associated with the first and second products in a repository;

d) storing at least one additional data associated with the lot in the repository to generate a collective data;

e) reading, utilizing a first RFID reader device emitting at least one frequency in the first frequency range, data stored on the first RFID tag;

f) identifying the lot based on the data read in step e); and g) retrieving data pertaining to the first product, the second product, or the first and second products from the collective data to monitor one or more products in the lot.

* * * * *